United States Patent
Shook et al.

(10) Patent No.: US 12,366,206 B2
(45) Date of Patent: Jul. 22, 2025

(54) VARIABLE DISPLACEMENT PUMP (VDP) SYSTEMS WITH DUAL DRY OUT PUMPS

(71) Applicant: Hamilton Sundstrand Corporation, Charlotte, NC (US)

(72) Inventors: Ryan Shook, Walla Walla, WA (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/244,390

(22) Filed: Sep. 11, 2023

(65) Prior Publication Data

US 2025/0084838 A1 Mar. 13, 2025

(51) Int. Cl.
*F02C 7/236* (2006.01)
*F02C 7/232* (2006.01)
*F04B 23/14* (2006.01)

(52) U.S. Cl.
CPC .............. *F02C 7/236* (2013.01); *F02C 7/232* (2013.01); *F04B 23/14* (2013.01)

(58) Field of Classification Search
CPC .. F02C 7/236; F02C 7/22; F02C 7/222; F02C 7/232; F02C 7/228; F02C 9/30; B64D 37/00; F04B 23/14
See application file for complete search history.

(56) References Cited

U.S. PATENT DOCUMENTS

| | | | | |
|---|---|---|---|---|
| 2,640,423 A * | 6/1953 | Boyer | ....................... | F02C 7/22 417/252 |
| 3,011,308 A | 12/1961 | Wotring | | |
| 5,168,704 A * | 12/1992 | Kast | .......................... | F02C 9/48 60/420 |
| 6,487,847 B1 * | 12/2002 | Snow | ........................ | F02K 3/10 60/764 |
| 7,185,485 B2 * | 3/2007 | Lewis | ...................... | F02C 9/263 60/764 |
| 7,584,602 B2 * | 9/2009 | Lewis | ...................... | F02C 9/263 60/764 |
| 8,166,765 B2 | 5/2012 | Baker et al. | | |

(Continued)

FOREIGN PATENT DOCUMENTS

EP 3365545 B1 9/2019

OTHER PUBLICATIONS

Extended European Search Report for European Patent Application No. 24199750.1, dated Feb. 10, 2025, 6 pages.

*Primary Examiner* — Alain Chau
(74) *Attorney, Agent, or Firm* — Kinney & Lange, P.A.

(57) ABSTRACT

A fuel system includes a main fuel pump sub-system (MFP) with an inlet for receiving a supply of fuel from an inlet line. The MFP has a main outlet line configured to supply fuel to a main fuel throttle valve assembly (MFTV), a first cross-over outlet line, and a second cross-over outlet line. An augmentor fuel pump sub-system (ABFP) has an inlet connected in fluid communication with the first cross-over outlet line, and an outlet connected in fluid communication with a main augmentor supply line. A variable displacement pump sub-system (VDPP) has an inlet connected in fluid communication with the second cross-over outlet line, a first outlet line configured to connect to supply fuel to the MFTV, and a second outlet line configured to connect to supply fuel to an actuation system.

20 Claims, 1 Drawing Sheet

(56) References Cited

U.S. PATENT DOCUMENTS

| | | | |
|---|---|---|---|
| 8,205,597 B2* | 6/2012 | Brocard | F02C 7/22 |
| | | | 123/457 |
| 8,302,406 B2 | 11/2012 | Baker | |
| 8,893,466 B2 | 11/2014 | Reuter | |
| 9,453,463 B2 | 9/2016 | Zielinski et al. | |
| 9,617,923 B2 | 4/2017 | Griffiths | |
| 9,657,643 B2* | 5/2017 | Veilleux, Jr. | F02C 7/236 |
| 9,850,917 B2 | 12/2017 | Mueller et al. | |
| 10,138,816 B2 | 11/2018 | Yates et al. | |
| 10,669,943 B2 | 6/2020 | Weir et al. | |
| 11,629,643 B1 | 4/2023 | Susca | |
| 11,713,724 B1 | 8/2023 | O'Rorke et al. | |
| 2003/0074884 A1* | 4/2003 | Snow | F02C 9/48 |
| | | | 60/764 |
| 2012/0234014 A1* | 9/2012 | Reuter | F02C 9/263 |
| | | | 60/773 |
| 2014/0174409 A1* | 6/2014 | Ripley | F02M 39/02 |
| | | | 123/506 |
| 2015/0101339 A1* | 4/2015 | Veilleux, Jr. | F02C 7/236 |
| | | | 60/734 |
| 2015/0192075 A1* | 7/2015 | Griffiths | F02C 7/26 |
| | | | 60/39.281 |
| 2016/0084272 A1* | 3/2016 | Mueller | B64D 37/34 |
| | | | 60/445 |
| 2016/0201574 A1* | 7/2016 | Kelly | F02C 9/30 |
| | | | 60/734 |
| 2019/0112987 A1 | 4/2019 | O'Rorke et al. | |
| 2021/0222625 A1* | 7/2021 | O'Rorke | F02C 7/236 |
| 2023/0034465 A1 | 2/2023 | Stoicescu | |
| 2023/0220804 A1 | 7/2023 | Goy | |

* cited by examiner

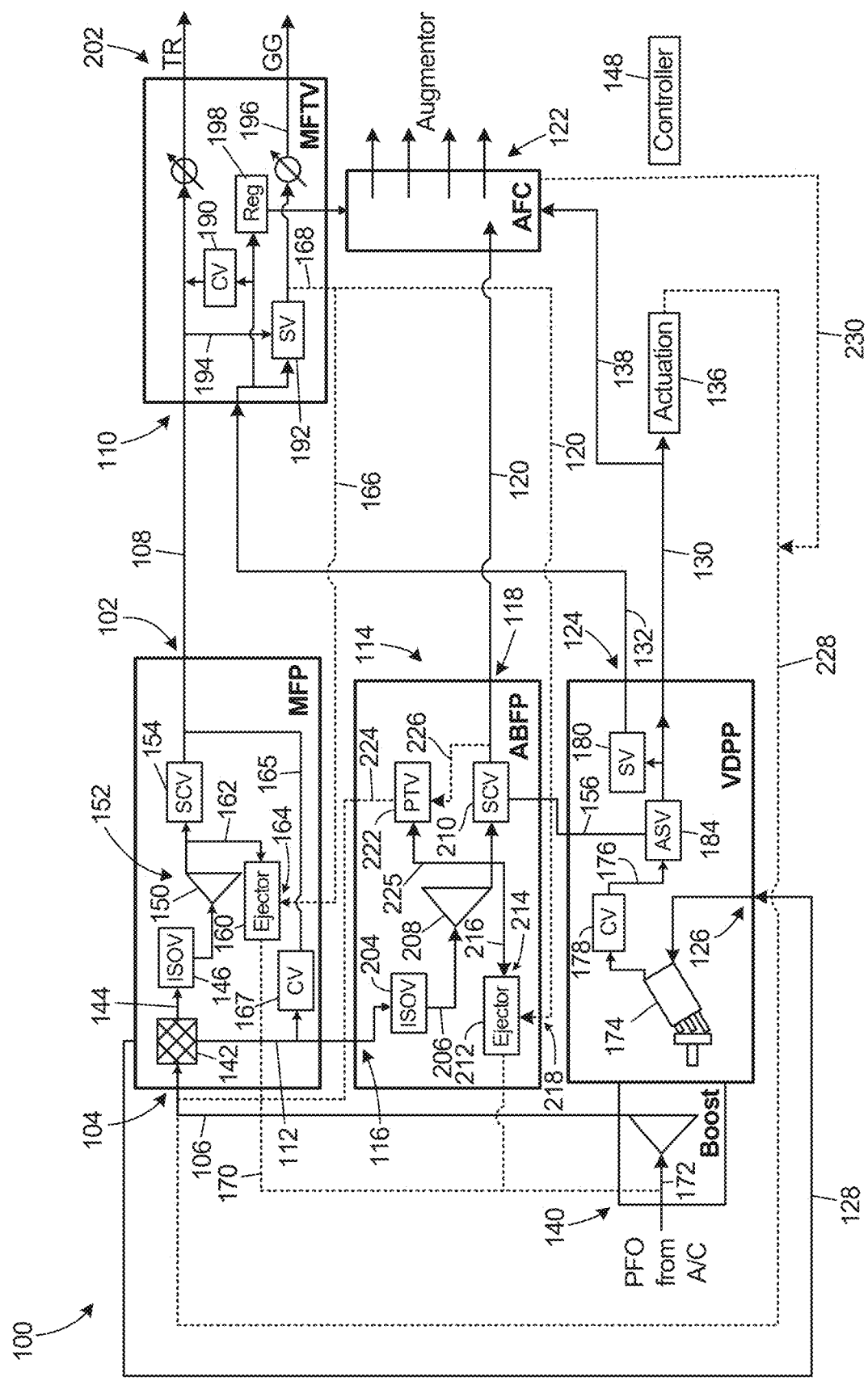

VARIABLE DISPLACEMENT PUMP (VDP) SYSTEMS WITH DUAL DRY OUT PUMPS

BACKGROUND

1. Field

The present disclosure relates to pump systems, and more particularly to fuel pump systems such as those used in gas turbine engines aboard aircraft.

2. Description of Related Art

There is a desire in modern aircraft design to reduce how much horsepower the fuel system extracts from the gearbox. In single engine aircraft it can be particularly difficult to design without using inefficient centrifugal main pumps because of their high reliability. These aircraft designs can struggle with satisfying fuel system thermal management requirements at low power conditions when centrifugal pumps are at their most inefficient.

The conventional techniques have been considered satisfactory for their intended purpose. However, there is an ever present need for improved systems and methods for improved fuel systems and methods. This disclosure provides a solution for this need.

SUMMARY

A fuel system includes a main fuel pump sub-system (MFP) with an inlet for receiving a supply of fuel from an inlet line. The MFP has a main outlet line configured to supply fuel to a main fuel throttle valve assembly (MFTV), a first cross-over outlet line, and a second cross-over outlet line. An augmentor fuel pump sub-system (ABFP) has an inlet connected in fluid communication with the first cross-over outlet line, and an outlet connected in fluid communication with a main augmentor supply line. A variable displacement pump sub-system (VDPP) has an inlet connected in fluid communication with the second cross-over outlet line, a first outlet line configured to connect to supply fuel to the MFTV, and a second outlet line configured to connect to supply fuel to an actuation system.

The actuation system can be connected in fluid communication with the second outlet line for hydraulic actuation. A boost pump configured to pressurize fuel from a source can be connected in fluid communication with the inlet of the MFP.

The MFP can include a filter in a centrifugal pump feed line. The filter can be connected in fluid communication with the inlet of the MFP. The MFP can include an inlet shut off valve (ISOV) in the centrifugal pump feed line downstream of the filter. The ISOV can be configured to switch between a first state blocking supply of fuel through the centrifugal pump feed line and a second state supplying fuel through the centrifugal pump feed line. The MFP can include a centrifugal pump connected in fluid communication with the centrifugal pump feed line downstream of the ISOV to be supplied with fuel from the filter with the ISOV in the second state. The centrifugal pump can have centrifugal pump outlet in fluid communication with the main outlet line.

The MFP can include a stabilizing check valve (SCV) in the main outlet line configured to allow flow from the centrifugal pump through the main outlet line, maintain pump stability during large flow demand changes and to prevent backflow from the main outlet line into the centrifugal pump. The MFP can include a centrifugal pump bypass line connecting in fluid communication from the filter to a point in the main outlet line downstream of the SCV. The centrifugal pump bypass line can include a check valve (CV) configured to prevent backflow from the main outlet line to the filter.

An ejector having a drain inlet can be connected to in fluid communication with a branch of the main outlet line that is upstream of the SCV, an ejection inlet connected in fluid communication with a return line from the MFTV, and an outlet connected in fluid communication with a return line configured to be connected to an inlet of a boost pump. The ejector can be configured to drain the centrifugal pump using flow from the VDPP through the MFTV.

The VDPP can include a variable positive displacement pump, with a pump inlet connected in fluid communication with the second cross-over outlet line, and an outlet connected in fluid communication with a main VDPP pump outlet line connected in fluid communication with the second outlet line. The VDPP can include a check valve (CV) in the main VDPP pump outlet line, configured to prevent backflow through the main VDPP outlet line into the variable positive displacement pump. The VDPP can include an actuator selector valve (ASV) in the main VDPP pump outlet line downstream of the CV.

The VDPP can include a selector valve (SV) connected in fluid communication with a branch of the main VDPP pump outlet line that is downstream of the ASV, and in fluid communication with the first outlet line. The SV can be configured to prevent flow from the VDPP to the MFTV in normal operation so the VDPP supplies an actuation system, and to allow flow from the VDPP to the MFTV with the MFP shut off in a low power mode.

The MFTV can be connected in fluid communication to receive fuel supplied from the VDPP and to output fuel to a gas generator (GG) during engine start-up, and to receive fuel supplied from the MFP and to output fuel to the GG after start-up. The MFTV can include an MFTV check valve (CV) connected in fluid communication between the main outlet line and the first outlet line of the VDPP, configured to prevent flow from the main outlet line to the first outlet line of the VDPP, and to allow flow from the first outlet line of the VDPP to the main outlet line. The MFTV can include a selector valve (SV) connected in fluid communication with the first outlet line of the VDPP, with a branch of the main outlet line upstream of the CV, and with an engine line. The SV can be configured to select between the main outlet line and the first outlet line of the VDPP to supply fuel from the MFTV to the engine line.

The MFTV can include a regulator connected between the first outlet line of the VDPP an augmentor fuel control line such that the regulator is configured to receive flow from the first outlet line of the VDPP and to output an augmentor fuel control flow. The MFTV can include a thermal recirculation line outlet in fluid communication with the main outlet line configured for supplying a thermal recirculation system.

An augmentor fuel control (AFC) can be connected in fluid communication with a line from the outlet of the ABFP, and with a branch of the second outlet line for providing fuel to an augmentor from the VDPP or MFP as needed. The ABFP can include an inlet shut-off valve (ISOV) in a centrifugal pump feed line that is in fluid communication with the inlet of the ABFP and the first cross-over outlet line. The ISOV can be configured to switch between a first state blocking supply of fuel through the centrifugal pump feed line and a second state supplying fuel through the centrifugal pump feed line. A centrifugal pump can be connected in fluid communication with the centrifugal pump feed line downstream of the ISOV to be supplied with fuel from the ISOV in the second state. The centrifugal pump can have centrifugal pump outlet in fluid communication with the main augmentor supply line. A stabilizing check valve (SCV) in the main augmentor supply line can be configured to allow flow from the centrifugal pump through the main augmentor supply line, maintain stable pump operation during large flow transients and to prevent backflow from the main augmentor supply line into the centrifugal pump. An ejector can have a drain inlet connected in fluid communication with a branch of the main augmentor supply line that is upstream of the SCV, an ejection inlet connected in fluid communication with a return line from the MFTV, and an outlet connected in fluid communication with a return line configured to be connected to an inlet of a boost pump. The ejector can be configured to drain the centrifugal pump using flow from the VDPP through the MFTV. A pump transfer valve (PTV) can be connected in fluid communication with a return line connected in fluid communication between the ABFP and the inlet line, in fluid communication with a branch of the main augmentor supply line upstream of the SCV, and with a return branch of the main augmentor supply line downstream of the SCV. The PTV can be configured to switch between returning flow from either downstream or upstream of the SCV to the return line.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of a system constructed in accordance with the present disclosure, showing the ejectors for drying the centrifugal pumps using flow from the positive displacement pump.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to dry centrifugal pumps when not in use, and to supply downstream systems instead with a positive displacement pump for low power operation including start up, taxiing, and ground readiness as in aircraft operation.

The fuel system 100 includes a main fuel pump sub-system (MFP) 102 with an inlet 104 for receiving a supply of fuel from an inlet line 106. The MFP 102 has a main outlet line 108 configured to supply fuel to a main fuel throttle valve assembly (MFTV) 110, first a cross-over outlet line 112, and a second cross-over outlet line 128. An augmentor fuel pump sub-system (ABFP) 114 has an inlet 116 connected in fluid communication with the cross-over outlet line 112, and an outlet 118 connected in fluid communication with a main augmentor supply line 120 for supplying fuel to an augmentor fuel control (AFC) 122. A variable displacement pump sub-system (VDPP) 124 has an inlet 126 connected in fluid communication with the second cross-over outlet line 128, a first outlet line 132 configured to connect to supply fuel to the MFTV 110, and a second outlet line 130 connected in fluid communication to supply fuel to an actuation system 136, and the AFC 122 via the branch 138 of the line 130.

The actuation system 136 is connected in fluid communication with the second outlet line for hydraulic actuation, e.g. wherein the aircraft uses fuel as a working fluid for hydraulics. A boost pump 140 is configured to pressurize fuel from a source such as a fuel tank (note that PFO from A/C in FIG. 1 indicates Pressure, Fuel 0, the lowest available pressure in the fuel system, the pressure provided by the aircraft tank pumps) and is connected in fluid communication with the inlet 104 of the MFP 102 via the line 106.

The MFP 102 includes a filter 142 in a centrifugal pump feed line 144, wherein the filter 142 is connected in fluid communication with the inlet 104 of the MFP 102. The MFP 102 includes an inlet shut off valve (ISOV) 146 in the centrifugal pump feed line 144 downstream of the filter 142. The ISOV 146 is configured, based on a control signal from a controller 148, to switch between a first state blocking supply of fuel through the centrifugal pump feed line 144 to the centrifugal pump 150, and a second state supplying fuel through the centrifugal pump feed line 144 to the centrifugal pump 150.

The MFP 102 includes the centrifugal pump 150 connected in fluid communication with the centrifugal pump feed line 144 downstream of the ISOV 146 to be supplied with fuel from the filter with the ISOV 146 in the second state. The centrifugal pump 150 has centrifugal pump outlet 152 in fluid communication with the main outlet line 108. The MFP 102 includes a stabilizing check valve (SCV) 154 in the main outlet line 108 configured to allow flow from the centrifugal pump 150 through the main outlet line 108, and to prevent backflow from the main outlet line 108 into the centrifugal pump 150. The SCV 154 is utilized to stabilize the centrifugal main pump operation. The main pump 150 responds quickly to changes in downstream demands, but with the significant volume in the downstream system it takes a while for the response to be seen by the downstream system. This can lead constructive feedback and unstable oscillatory behavior so the SCV 154 acts as a damper to the main pump 150.

An ejector 160 is included in the MFP 102, having a drain inlet 162 connected to in fluid communication with a branch 162 of the main outlet line that is upstream of the SCV 154, an ejection inlet 164 connected in fluid communication with a branch 166 of the return line 168 from the MFTV 110, and an outlet connected in fluid communication with a return line 170 connected to an inlet 172 of the boost pump 140. The ejector 164 is configured to drain the centrifugal pump 150 using flow from the VDPP 124 through the MFTV 110. This is a dry out system to reduce/minimize horsepower extraction by the centrifugal pump 150 when the VDPP 5 124 is supplying the MFTV 110 and the centrifugal pump 150 is shut down. This can be used for gas turbine engine start up, ground idle, taxi, other low power conditions. The actuation pump 174 of the VDPP 124 delivers the bum flow to the gas generator (GG) during such low power conditions. The MFP 102 is responsible for some or all of the operational regime of the main gas generator GG, and the ABFP 114 is responsible for the augmentor bum as needed. The MFP 102 can include a centrifugal pump bypass line 165 connecting in fluid communication from the filter 142 to a point in the main outlet line 108 downstream of the SCV 154. The centrifugal pump bypass line 165 can include a check valve (CV) 167 configured to prevent backflow from the main outlet line 108 to the filter 142.

The VDPP 124 includes a variable positive displacement pump 174, e.g., a bent axis piston pump. The pump 174 has a pump inlet connected in fluid communication with the second cross-over outlet line 128, and an outlet connected in fluid communication with a main VDPP pump outlet line 176 connected in fluid communication with the second outlet line 130. The VDPP 124 includes a check valve (CV) 178 in the main VDPP pump outlet line 176, configured to prevent backflow through the main VDPP outlet line 176 into the variable positive displacement pump 174. The line 156 from the SCV 210 to the ASV 184 provides for the ABFP 114 to back-up the VDPP 124 in the event of a failure, in which case the CV 178 prevents backflow as indicated above. The VDPP 124 includes an actuator selector valve (ASV) 184 in the main VDPP pump outlet line 176 downstream of the CV 178. The ASV 184 is configured, based on a signal from the controller 148 to select backup flow from the ABFP 114 for actuation if needed in the event of a pump failure.

The VDPP 124 includes a selector valve (SV) 180 connected in fluid communication with a branch of the main VDPP pump outlet line 176 that is downstream of the ASV 184, and in fluid communication with the first outlet line 132. The SV 180 is configured to prevent flow from the VDPP 124 to the MFTV 110 in normal operation so the VDPP 124 supplies the actuation system 136 without supplying the MFTV 110, and to allow flow from the VDPP 124 to the MFTV 110 with the MFP 102 shut off in any of the low power modes.

The MFTV 110 is connected in fluid communication to receive fuel supplied from the VDPP 124 and to output fuel to a gas generator (GG) during engine start-up, and other low power modes as described above, and to receive fuel supplied from the MFP 102 and output fuel to the GG after start-up or when not in the other low power modes. The MFTV 110 includes an MFTV check valve (CV) 190 connected in fluid communication between the main outlet line 108 and the first outlet line branch 132 of the VDPP 124, configured to prevent flow from the main outlet line 108 to the first outlet line branch 132 of the VDPP 124 when the VDPP 124 is not supplying fuel to the MFTV 110, and to allow flow from the first outlet line 132 of the VDPP 124 to the main outlet line 108 otherwise.

The MFTV 110 includes a selector valve (SV) 192 connected in fluid communication with the first outlet line 132 of the VDPP 124, with a branch 194 of the main outlet line 108 upstream of the CV 190, and with an engine line 196. The SV 192 is configured to select between the main outlet line 108 and the first outlet line 132 of the VDPP 124 to supply fuel from the MFTV 110 to the engine line 196 such for supplying fuel injectors in a gas turbine engine combustor. The SV 192 can be controlled by the controller 148 to change the state of the SV 148 based on the mode of operation, or in certain embodiments, the SV 148 can be passively controlled by pressure differential between the main outlet line 108 and the first outlet line 132 of the VDPP 124. In the start-up and low power modes, the SV 192 can be configured to select the line 132 to supply fuel to the engine line 196. Otherwise in other modes, (e.g., the normal run mode, or a failure mode wherein the pump 174 fails), the SV 192 can be configured to select the main outlet line 108 to supply fuel to the engine line 196.

The MFTV 110 includes a regulator 198 connected between the first outlet line 132 of the VDPP 124 and an augmentor fuel control line 200 such that the regulator 198 is configured, e.g. based on control signals from the controller 148, to receive flow from the first outlet line 132 and to output an augmentor fuel control flow to the AFC 200. The regulator 198 provides a constant fixed control pressure to the EHSVs (electrohydraulic sector valves) in the MFTV 110 and AFC 122 in all modes. The fixed pressure is meant to ensure constant control gains (EHSV current in to change in ESHV pressure out). If this pressure were not regulated, then a pressure sensor would be required in order to have variable software gains based on the pressure sensor reading. The MFTV 110 includes a thermal recirculation line outlet 202 in fluid communication with the main outlet line 108 downstream of the CV 190 configured for supplying a thermal recirculation system (TR).

The augmentor fuel control (AFC) 122 is connected in fluid communication with the line 120 from the outlet 118 of the ABFP 114, and with a branch 138 of the second outlet line 130 for providing fuel to an augmentor from the VDPP 124 or MFP 102 as needed based on the mode of operation. The ABFP 114 includes an inlet shut off valve (ISOV) 204 in a centrifugal pump feed line 206 that is in fluid communication with the inlet of the ABFP 114 and the cross-over outlet line 112. The ISOV 204 is configured, based on a control signal from a controller 148, switch between a first state blocking supply of fuel through the centrifugal pump feed line 206 to the centrifugal pump 208, and a second state supplying fuel through the centrifugal pump feed line 206 to the centrifugal pump 208. The centrifugal pump 208 is connected in fluid communication with the centrifugal pump feed line 206 downstream of the ISOV 204 to be supplied with fuel from the ISOV 204 in the second state of the ISOV 204. The centrifugal pump 208 has centrifugal pump outlet in fluid communication with the main augmentor supply line 120. A stabilizing check valve (SCV) 210 in the main augmentor supply line 120 is configured to allow flow from the centrifugal pump 208 through the main augmentor supply line 120, and to prevent backflow from the main augmentor supply line 120 into the centrifugal pump 208. An ejector 212 has a drain inlet 214 connected in fluid communication with a branch 216 of the main augmentor supply line 120 that is upstream of the SCV 210, an ejection inlet 218 connected in fluid communication with a branch 220 of the return line 168 from the MFTV 110, and an outlet connected in fluid communication with the return line 170 connected in fluid communication to return fuel to the inlet 172 of the boost pump 140. The ejector 212 is configured to drain the centrifugal pump 208 using flow from the VDPP 124 through the MFTV 110. As described above with respect to the ejector 160, this is a dry out system to reduce/minimize horsepower extraction when the VDPP 124 is supplying the MFTV 110 and the centrifugal pump 208 is shut down. A pump transfer valve (PTV) 222 is connected in fluid communication with a return line 224 connected in fluid communication between the ABFP 118 and the inlet line 106. The PTV 222 is also in fluid communication with a branch 225 of the main augmentor supply line 120 upstream of the SCV 210, and with a return branch 226 of the main augmentor supply line 120 downstream of the SCV 210. The PTV 222 is configured, passively or actively by control signal from the controller 148, to switch between returning flow from either downstream or upstream of the SCV 210 to the return line 224. If the ABFP 118 is powered off, the PTV 222 links main pump pressure to the AFC 122, allowing AFC priming and augmentor light-off (while ABFP 118 is being turned on and pressure in the ABFP 118 is pulling up) for faster transition into augmented conditions. If the ABFP 118 is powered on, the PTV 222 links the ABFP 118 to the main pump pressure to allow a constant flow path for pump cooling. The PTV 222 ensures a minimum demand on the ABFP 118 to prevent pump overheating when AFC demand is low.

In FIG. 1, the solid lines are feed lines, and the dotted lines are return lines. A first return line 228 is connected in fluid communication with the inlet 104 of the MFP 102, configured to return flow from the actuation system 136. A second return line 230 is connected in fluid communication with the first return line 228 and is connected to return flow from the AFC 122 to the first return line 228.

Systems and methods as disclosed herein allow the main pump 150 to be a selectable pump with a dry-out system to minimize horsepower extraction when turned off. The main pump 150 can be turned off at low power conditions such as ground idle, taxi, start up, and the like, and the actuation pump 174 can be allowed to deliver the burn flow. The augmentor pump 208 is turned on for augmentation operation, and for actuation back-up in the event of an actuation pump failure. The main pump 150 is sized for some or all of the operational regime of the gas generator GG. The VDPP 124 can potentially run a gas turbine engine up to 50% speed or more for startup, ground idle, taxiing, and the like. The main pump 150 does not feed the pump 174 of the VDPP, and there is no need for supercharging the pump 174.

Systems and methods as disclosed herein provide potential benefits including the following. They can reduce fuel pump horsepower extraction. They can also reduce main pump turn down ratio, which improves overall efficiency. The methods and systems of the present disclosure, as described above and shown in the drawings, provide for drying centrifugal pumps when not in use, and to supplying downstream systems instead with a positive displacement pump for low power operation including start up, taxiing, and ground readiness as in aircraft operation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel system comprising:
   a main fuel pump sub-system (MFP) with an inlet for receiving a supply of fuel from an inlet line, wherein the MFP has a main outlet line configured to supply fuel to a main fuel throttle valve assembly (MFTV), a first cross-over outlet line, and a second cross-over outlet line;
   an augmentor fuel pump sub-system (ABFP) with an inlet connected in fluid communication with the first cross-over outlet line, and an outlet connected in fluid communication with a main augmentor supply line; and
   a variable displacement pump sub-system (VDPP) with an inlet connected in fluid communication with the second cross-over outlet line, a first outlet line configured to connect to supply fuel to the MFTV, and a second outlet line configured to connect to supply fuel to an actuation system;
   wherein the MFTV includes an MFTV check valve (MFTVCV) connected in fluid communication between the main outlet line and the first outlet line of the VDPP, configured to prevent flow from the main outlet line to the first outlet line of the VDPP, and to allow flow from the first outlet line of the VDPP to the main outlet line; and
   wherein the MFTV includes a selector valve (MFTVSV) connected in fluid communication with the first outlet line of the VDPP, with a branch of the main outlet line upstream of the MFTVCV, and with an engine line, wherein the MFTVSV is configured to select between the main outlet line and the first outlet line of the VDPP to supply fuel from the MFTV to the engine line.

2. The system as recited in claim 1, further comprising the actuation system connected in fluid communication with the second outlet line for hydraulic actuation.

3. The system as recited in claim 1, further comprising a boost pump configured to pressurize fuel from a source and connected in fluid communication with the inlet of the MFP.

4. The system as recited in claim 1, wherein the MFP includes a filter in a centrifugal pump feed line, wherein the filter is connected in fluid communication with the inlet of the MFP.

5. The system as recited in claim 4, wherein the MFP includes an inlet shut off valve (ISOV) in the centrifugal pump feed line downstream of the filter, wherein the ISOV is configured to switch between a first state blocking supply of fuel through the centrifugal pump feed line and a second state supplying fuel through the centrifugal pump feed line.

6. The system as recited in claim 5, wherein the MFP includes a centrifugal pump connected in fluid communication with the centrifugal pump feed line downstream of the ISOV to be supplied with fuel from the filter with the ISOV in the second state, wherein the centrifugal pump has centrifugal pump outlet in fluid communication with the main outlet line.

7. The system as recited in claim 6, wherein the MFP includes a stabilizing check valve (SCV) in the main outlet line configured to allow flow from the centrifugal pump through the main outlet line, and to prevent backflow from the main outlet line into the centrifugal pump.

8. The system as recited in claim 7, wherein the MFP includes a centrifugal pump bypass line connecting in fluid communication from the filter to a point in the main outlet line downstream of the SCV, wherein the centrifugal pump bypass line includes a check valve (MFPCV) configured to prevent backflow from the main outlet line to the filter.

9. The system as recited in claim 8, further comprising an ejector having a drain inlet connected to in fluid communication with a second branch of the main outlet line that is upstream of the SCV, an ejection inlet connected in fluid communication with a return line from the MFTV, and an outlet connected in fluid communication with a return line configured to be connected to an inlet of a boost pump, wherein the ejector is configured to drain the centrifugal pump using flow from the VDPP through the MFTV.

10. The system as recited in claim 1, wherein the VDPP includes a variable positive displacement pump, with a pump inlet connected in fluid communication with the second cross-over outlet line, and an outlet connected in fluid communication with a main VDPP pump outlet line connected in fluid communication with the second outlet line.

11. The system as recited in claim 10, wherein the VDPP includes a check valve (VDPPCV) in the main VDPP pump outlet line, configured to prevent backflow through the main VDPP outlet line into the variable positive displacement pump.

12. The system as recited in claim 11, wherein the VDPP includes an actuator selector valve (ASV) in the main VDPP pump outlet line downstream of the VDPPCV.

13. The system as recited in claim 12, wherein the VDPP includes a selector valve (VDPPSV) connected in fluid communication with a branch of the main VDPP pump outlet line that is downstream of the ASV, and in fluid communication with the first outlet line, wherein the VDPPSV is configured to prevent flow from the VDPP to the MFTV in normal operation so the VDPP supplies an actuation system, and to allow flow from the VDPP to the MFTV with the MFP shut off in a low power mode.

14. The system as recited in claim 1, further comprising the MFTV connected in fluid communication to receive fuel supplied from the VDPP and to output fuel to a gas generator (GG) during engine start-up, and to receive fuel supplied from the MFP and to output fuel to the GG after start-up.

15. The system as recited in claim 14, further comprising an augmentor fuel control (AFC) connected in fluid communication with a line from the outlet of the ABFP, and with a branch of the second outlet line for providing fuel to an augmentor from the VDPP or MFP as needed.

16. The system as recited in claim 1, wherein the MFTV includes a regulator connected between the first outlet line of the VDPP an augmentor fuel control line such that the regulator is configured to receive flow from the first outlet line of the VDPP and to output an augmentor fuel control flow.

17. The system as recited in claim 16, wherein the MFTV includes a thermal recirculation line outlet in fluid communication with the main outlet line configured for supplying a thermal recirculation system.

18. The system as recited in claim 1, wherein the ABFP includes:
an inlet shut off valve (ISOV) in a centrifugal pump feed line that is in fluid communication with the inlet of the ABFP and the first cross-over outlet line, wherein the ISOV is configured to switch between a first state blocking supply of fuel through the centrifugal pump feed line and a second state supplying fuel through the centrifugal pump feed line;
a centrifugal pump connected in fluid communication with the centrifugal pump feed line downstream of the ISOV to be supplied with fuel from the ISOV in the second state, wherein the centrifugal pump has centrifugal pump outlet in fluid communication with the main augmentor supply line;
a stabilizing check valve (SCV) in the main augmentor supply line configured to allow flow from the centrifugal pump through the main augmentor supply line, and to prevent backflow from the main augmentor supply line into the centrifugal pump;
an ejector having a drain inlet connected in fluid communication with a branch of the main augmentor supply line that is upstream of the SCV, an ejection inlet connected in fluid communication with a return line from the MFTV, and an outlet connected in fluid communication with a return line configured to be connected to an inlet of a boost pump, wherein the ejector is configured to drain the centrifugal pump using flow from the VDPP through the MFTV; and
a pump transfer valve (PTV) connected in fluid communication with a return line connected in fluid communication between the ABFP and the inlet line, in fluid communication with the branch of the main augmentor supply line upstream of the SCV, and with a return branch of the main augmentor supply line downstream of the SCV, wherein the PTV is configured to switch between returning flow from either downstream or upstream of the SCV to the return line.

19. A fuel system comprising:
a main fuel pump sub-system (MFP) with an inlet for receiving a supply of fuel from an inlet line, wherein the MFP has a main outlet line configured to supply fuel to a main fuel throttle valve assembly (MFTV), a first cross-over outlet line, and a second cross-over outlet line;
an augmentor fuel pump sub-system (ABFP) with an inlet connected in fluid communication with the first cross-over outlet line, and an outlet connected in fluid communication with a main augmentor supply line; and
a variable displacement pump sub-system (VDPP) with an inlet connected in fluid communication with the second cross-over outlet line, a first outlet line configured to connect to supply fuel to the MFTV, and a second outlet line configured to connect to supply fuel to an actuation system;
wherein the ABFP includes:
an inlet shut off valve (ISOV) in a centrifugal pump feed line that is in fluid communication with the inlet of the ABFP and the first cross-over outlet line, wherein the ISOV is configured to switch between a first state blocking supply of fuel through the centrifugal pump feed line and a second state supplying fuel through the centrifugal pump feed line;
a centrifugal pump connected in fluid communication with the centrifugal pump feed line downstream of the ISOV to be supplied with fuel from the ISOV in the second state, wherein the centrifugal pump has centrifugal pump outlet in fluid communication with the main augmentor supply line;
a stabilizing check valve (SCV) in the main augmentor supply line configured to allow
flow from the centrifugal pump through the main augmentor supply line, and to prevent backflow from the main augmentor supply line into the centrifugal pump;
an ejector having a drain inlet connected in fluid communication with a branch of the main augmentor supply line that is upstream of the SCV, an ejection inlet connected in fluid communication with a return line from the MFTV, and an outlet connected in fluid communication with a return line configured to be connected to an inlet of a boost pump, wherein the ejector is configured to drain the centrifugal pump using flow from the VDPP through the MFTV; and
a pump transfer valve (PTV) connected in fluid communication with a return line connected in fluid communication between the ABFP and the inlet line, in fluid communication with the branch of the main augmentor supply line upstream of the SCV, and with a return branch of the main augmentor supply line downstream of the SCV, wherein the PTV is configured to switch between returning flow from either downstream or upstream of the SCV to the return line.

20. A fuel system comprising:
a main fuel pump sub-system (MFP) with an inlet for receiving a supply of fuel from an inlet line, wherein the MFP has a main outlet line configured to supply fuel to a main fuel throttle valve assembly (MFTV), a first cross-over outlet line, and a second cross-over outlet line;

an augmentor fuel pump sub-system (ABFP) with an inlet connected in fluid communication with the first cross-over outlet line, and an outlet connected in fluid communication with a main augmentor supply line; and a variable displacement pump sub-system (VDPP) with an inlet connected in fluid communication with the second cross-over outlet line, a first outlet line configured to connect to supply fuel to the MFTV, and a second outlet line configured to connect to supply fuel to an actuation system;

a first stabilizing check valve (SCV) in the main outlet line;

a first ejector having a first drain inlet in fluid communication with a branch of the main outlet line upstream of the first SCV, a first ejection inlet connected in fluid communication with a return line from the MFTV, and a first outlet connected in fluid communication with the inlet line;

a second stabilizing check valve (SCV) in the main augmentor supply line; and a second ejector having a second drain inlet in fluid communication with a branch of the main augmentor supply line upstream of the second SCV, a second ejection inlet connected in fluid communication with the return line from the MFTV, and a second outlet connected in fluid communication with the inlet line;

wherein the first ejector is configured to drain a centrifugal pump of the MFP and the second ejector is configured to drain a centrifugal pump of the ABFP, each using flow from the VDPP through the MFTV.

* * * * *